(12) United States Patent
Fujioka et al.

(10) Patent No.: US 11,309,693 B2
(45) Date of Patent: Apr. 19, 2022

(54) GAS-INSULATED SWITCHGEAR

(71) Applicant: Mitsubishi Electric Corporation, Tokyo (JP)

(72) Inventors: Masahiro Fujioka, Tokyo (JP); Yasuhiro Tsukao, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 76 days.

(21) Appl. No.: 16/756,871

(22) PCT Filed: Jan. 31, 2018

(86) PCT No.: PCT/JP2018/003276
§ 371 (c)(1),
(2) Date: Apr. 17, 2020

(87) PCT Pub. No.: WO2019/150508
PCT Pub. Date: Aug. 8, 2019

(65) Prior Publication Data
US 2021/0194224 A1 Jun. 24, 2021

(51) Int. Cl.
*H01H 31/26* (2006.01)
*H02B 13/035* (2006.01)
(Continued)

(52) U.S. Cl.
CPC .......... *H02B 13/045* (2013.01); *H01H 31/26* (2013.01); *H02B 13/0358* (2013.01); *H02B 13/075* (2013.01)

(58) Field of Classification Search
CPC ...... H01H 31/26; H01H 31/02; H02B 13/045; H02B 13/0358; H02B 13/075; H02B 13/035
(Continued)

(56) References Cited

U.S. PATENT DOCUMENTS

| 3,546,356 A | 12/1970 | Graybill et al. |
| 4,017,675 A | 4/1977 | Hopkins et al. |

(Continued)

FOREIGN PATENT DOCUMENTS

| JP | S51150084 A | 12/1976 |
| JP | S6062806 A | 4/1985 |

(Continued)

OTHER PUBLICATIONS

European Office Action dated Dec. 10, 2020 issued by the European Patent Office in corresponding European Patent Application No. 18903089.3 (8 pages).

(Continued)

*Primary Examiner* — William A Bolton
(74) *Attorney, Agent, or Firm* — Buchanan Ingersoll & Rooney PC

(57) ABSTRACT

A gas-insulated switchgear includes a main circuit conductor forming a bus line, a tank having a tubular main body in which the main circuit conductor forming the bus line is provided at its center, and a grounding-switch tank that is a branch pipe connected to the main body, in which a movable contact forming a branch line that branches from the main circuit conductor forming the bus line is provided, where a tubular surface of the main body is spherical, and has an opening that allows the movable contact to pass therethrough.

2 Claims, 3 Drawing Sheets

(51) Int. Cl.
*H02B 13/045* (2006.01)
*H02B 13/075* (2006.01)

(58) Field of Classification Search
USPC ........ 218/51, 45, 55, 56, 57, 61, 67, 68, 75, 218/79, 80, 100
See application file for complete search history.

(56) References Cited

U.S. PATENT DOCUMENTS

| | | | |
|---|---|---|---|
| 4,413,166 A | 11/1983 | Meyer | |
| 5,841,087 A * | 11/1998 | Fuchsle | H02B 13/035 218/45 |
| 7,429,710 B2 * | 9/2008 | Gutalj | H02B 13/075 218/55 |
| 8,106,326 B2 | 1/2012 | Nakauchi et al. | |
| 8,803,012 B2 * | 8/2014 | Goeschel | H01H 33/42 200/18 |
| 8,859,925 B2 * | 10/2014 | Luthy | H02B 13/035 218/53 |
| 2004/0042158 A1 * | 3/2004 | Otsuka | H01H 31/003 361/605 |
| 2012/0012449 A1 * | 1/2012 | Shin | H01H 31/003 200/5 B |

FOREIGN PATENT DOCUMENTS

| | | |
|---|---|---|
| JP | H05304705 A | 11/1993 |
| JP | H06119852 A | 4/1994 |
| JP | 2009163946 A | 7/2009 |

OTHER PUBLICATIONS

International Search Report (PCT/ISA/210) dated Apr. 24, 2018, by the Japan Patent Office as the International Searching Authority for International Application No. PCT/JP2018/003276.

Written Opinion (PCT/ISA/237) dated Apr. 24, 2018, by the Japan Patent Office as the International Searching Authority for International Application No. PCT/JP2018/003276.

* cited by examiner

GAS-INSULATED SWITCHGEAR

FIELD

The present invention relates to a gas-insulated switchgear in which a conductor is arranged in a tank with insulating gas enclosed therein.

BACKGROUND

A tank of a gas-insulated switchgear includes a cylindrical main body. A bus line that is a conductor of a main circuit is arranged coaxially with a main body axis that is a center line of the main body of the tank. When a branch line is branched from the bus line, a branch pipe having a central axis that is perpendicular to the main body axis is branched from the main body, and the branch line is arranged in the branch pipe.

In Patent Literature 1, a grounding switch that is one of structures for allowing a branch line to branch from a bus line is disclosed. This grounding switch is a device having a function of grounding a main circuit. Because the branch line branching from a bus line of a gas-insulated switchgear extends in a perpendicular direction to the main body axis, a direction in which the branch line extends can be changed by rotating the main body around the main body axis. With this configuration, even when there is an obstacle, it is possible to avoid the obstacle in a direction of rotation around the main body axis.

CITATION LIST

Patent Literature

Patent Literature 1: Japanese Patent Application Laid-open No. 2009-163946

SUMMARY

Technical Problem

However, when there is an obstacle extending in a circumferential direction of the main body, there is a case where it is not possible to avoid the obstacle even when the direction of the branch pipe is changed by rotating the main body around the main body axis. In this case, the providing position of the branch pipe has to be shifted along the main body axis, so that the layout of the gas-insulated switchgear has restrictions.

The present invention has been achieved in view of the above problems, and an object of the present invention is to provide a gas-insulated switchgear having highly flexible layout.

Solution to Problem

An aspect of the present invention includes: a main circuit conductor forming a bus line; a tank having a tubular main body in which the bus line is arranged at its center; and a branch pipe connected to the main body, in which a branch line branching from the bus line is provided. A tubular surface of the main body is spherical, and has an opening that allows the branch line to pass therethrough on the tubular surface.

Advantageous Effects of Invention

According to the present invention, there is an effect where it is possible to improve flexibility of the layout of a gas-insulated switchgear.

DESCRIPTION OF EMBODIMENTS

A gas-insulated switchgear according to embodiments of the present invention will be described in detail below with reference to the accompanying drawings. The present invention is not limited to the embodiments.

First Embodiment

Figure 1:
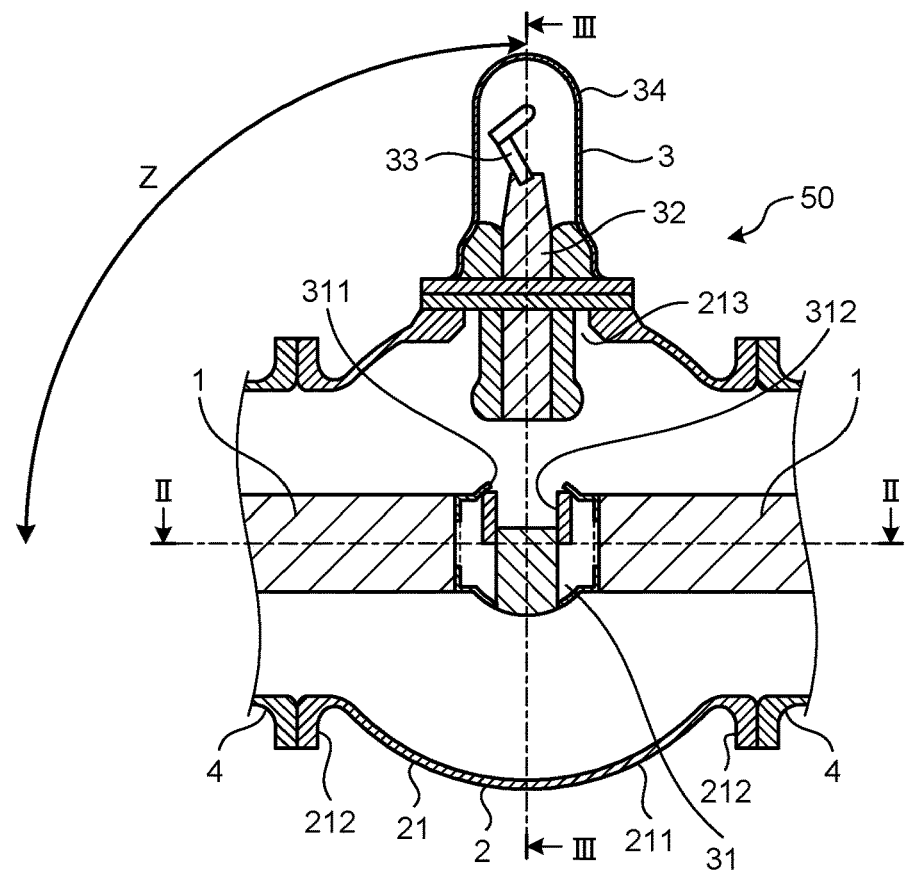
FIG. 1 is a cross-sectional view illustrating a configuration of a gas-insulated switchgear according to a first embodiment of the present invention including a main body axis.
Figure 2:
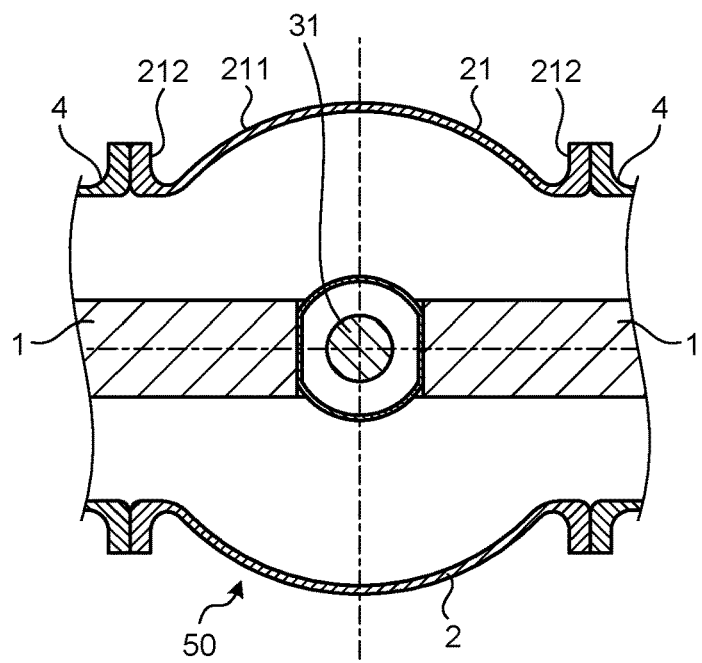
FIG. 2 is a cross-sectional view illustrating a configuration of the gas-insulated switchgear according to the first embodiment including the main body axis.
Figure 3:
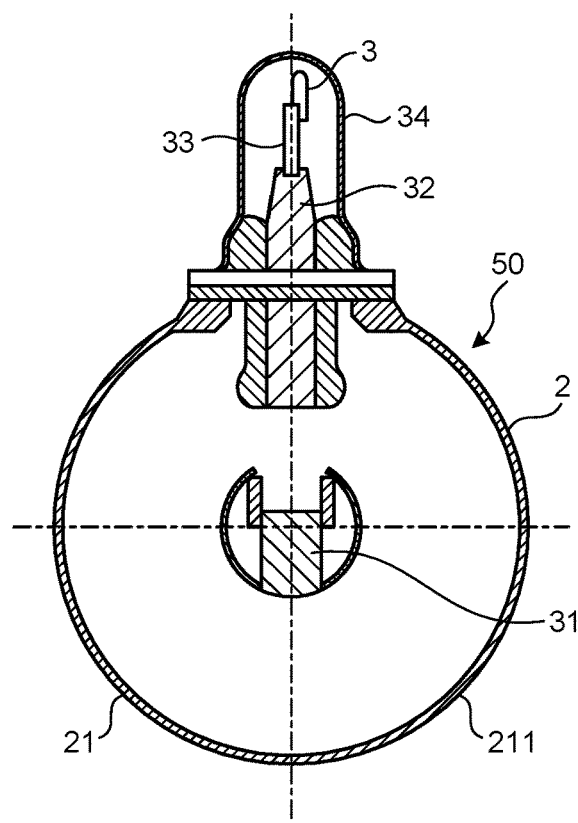
FIG. 3 is a cross-sectional view taken along a line perpendicular to the main body axis of the gas-insulated switchgear according to the first embodiment.

FIGS. 1 and 2 are cross-sectional views illustrating a configuration of a gas-insulated switchgear according to a first embodiment of the present invention each including a main body axis. FIG. 3 is a cross-sectional view taken along a line perpendicular to the main body axis of the gas-insulated switchgear according to the first embodiment. FIG. 2 illustrates a cross-section taken along a line II-II in FIG. 1. FIG. 3 illustrates a cross-section taken along a line III-III in FIG. 1. A gas-insulated switchgear 50 according to the first embodiment includes a main circuit conductor 1 forming a bus line, a tank 2 including a tubular main body 21, in which the bus line arranged at the center, and a grounding switch 3. In the following descriptions, the central axis of the main body 21 is described as "main body axis". Insulating gas is enclosed in the tank 2. The grounding switch 3 includes a fixed electrode 31 that is interposed between main circuit conductors 1 and forms a portion of the bus line, a movable contact 32 that is arranged to face to the fixed electrode 31, a link mechanism 33 that moves the movable contact 32, and a grounding-switch tank 34 that covers the movable contact 32 and the link mechanism 33.

The movable contact 32 has a circular cross-section that is perpendicular to its moving direction. The fixed electrode 31 has a spherical shape in which portions that are connected to the main circuit conductors 1 are flat, and the fixed electrode 31 is in surface-contact with the main circuit conductors 1. A circular hole 311 is formed in a portion of the fixed electrode 31 having a spherical surface, and the movable contact 32 is to be inserted into the circular hole 311. A stator contact 312 is provided in the hole 311.

In FIG. 1, the fixed electrode 31 and the movable contact 32 are apart from each other; however, when a main circuit is grounded, the link mechanism 33 is driven by a drive mechanism provided outside the grounding-switch tank 34, and the movable contact 32 is moved to be inserted into the fixed electrode 31 through the hole 311, so that the movable contact 32 becomes a branch line branching from the bus line. Therefore, the grounding-switch tank 34 is a branch pipe that surrounds the branch line branching from the bus line.

The main body 21 has a spherical tubular surface 211, and has flanges 212 at both end thereof for connection to adjacent tanks 4. An opening 213 is formed in the tubular surface 211 of the main body 21, to which the grounding-switch tank 34 is connected. The movable contact 32 serving as a branch line protrudes out of the tank 2 through the opening 213.

In order to prevent interference between an obstacle adjacent to the tank 2 and a grounding switch, the direction the opening 213 is facing is inclined at an angle Z with respect to the main body axis. Therefore, the main circuit conductors 1 forming a bus line and the movable contact 32 serving as a branch line are inclined to each other at the angle Z. Further, the grounding-switch tank 34 forming a branch pipe is inclined at the angle Z with respect to the main body axis. In the gas-insulated switchgear 50 illustrated in FIGS. 1 to 3, the angle Z between the direction the opening 213 is facing and the main body axis is 90°. However, in the gas-insulated switchgear 50 according to the first embodiment, the angle Z between the direction the opening 213 is facing and the main body axis is not limited to 90°.

In a case where a tubular surface of a main body is cylindrical, when an opening is formed in the main body at an inclination angle other than 90° with respect to the main body axis by using a tool having a circular cross section such as a drill, the opening shape becomes elliptical, so that it becomes difficult to form such an opening. Further, when the opening shape is elliptical, an edge portion having an acute angle is formed at a boundary between the main body and a branch pipe, so that it becomes difficult to ensure insulation.

In the gas-insulated switchgear 50 according to the first embodiment, the tubular surface 211 of the main body 21 is spherical. Therefore, it is possible to form the opening 213 having a circular opening shape in the tubular surface 211 of the main body 21 even when the angle of inclination with respect to the main body axis is other than 90°. Further, even when a branch pipe is connected to the main body 21 at an angle of inclination other than 90° with respect to the main body axis, any edge portion is not formed at a boundary between the main body 21 and the branch pipe, and insulation can be ensured. Similarly, because the fixed electrode 31 is spherical and the portions thereof to be connected to the main circuit conductors 1 are flat, even when the inclination with respect to the main body axis is other than 90°, it is possible to easily form the circular hole 311 into which the movable contact 32 is inserted.

When the main body 21 of the tank 2 is formed by casting, it is possible to suppress increase of the manufacturing cost as compared with a tank having a cylindrical tubular surface. When the fixed electrode 31 is formed by casting, it is possible to suppress increase of the manufacturing cost as compared with a columnar fixed electrode.

Figure 4:
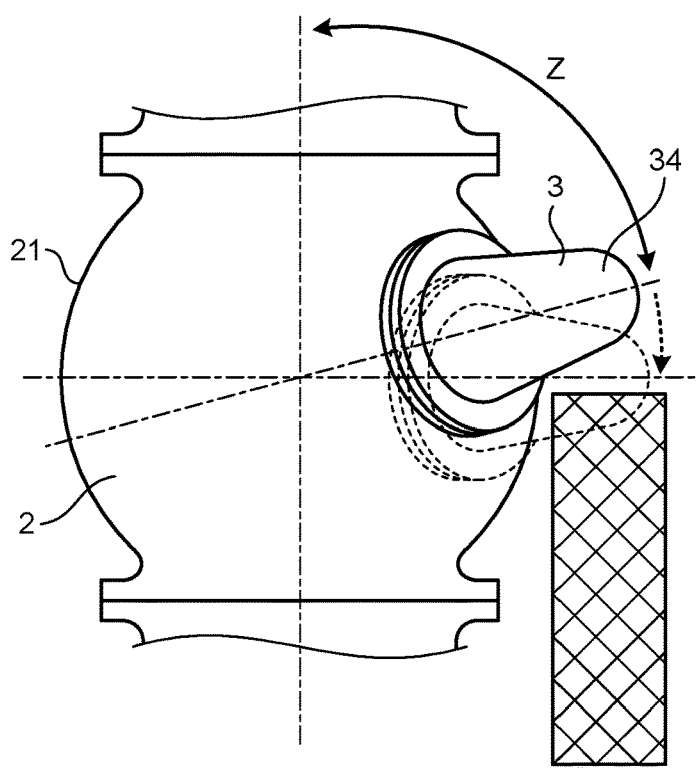
FIG. 4 is a plan view illustrating a state in which an obstacle for the gas-insulated switchgear according to the first embodiment is avoided.
Figure 5:
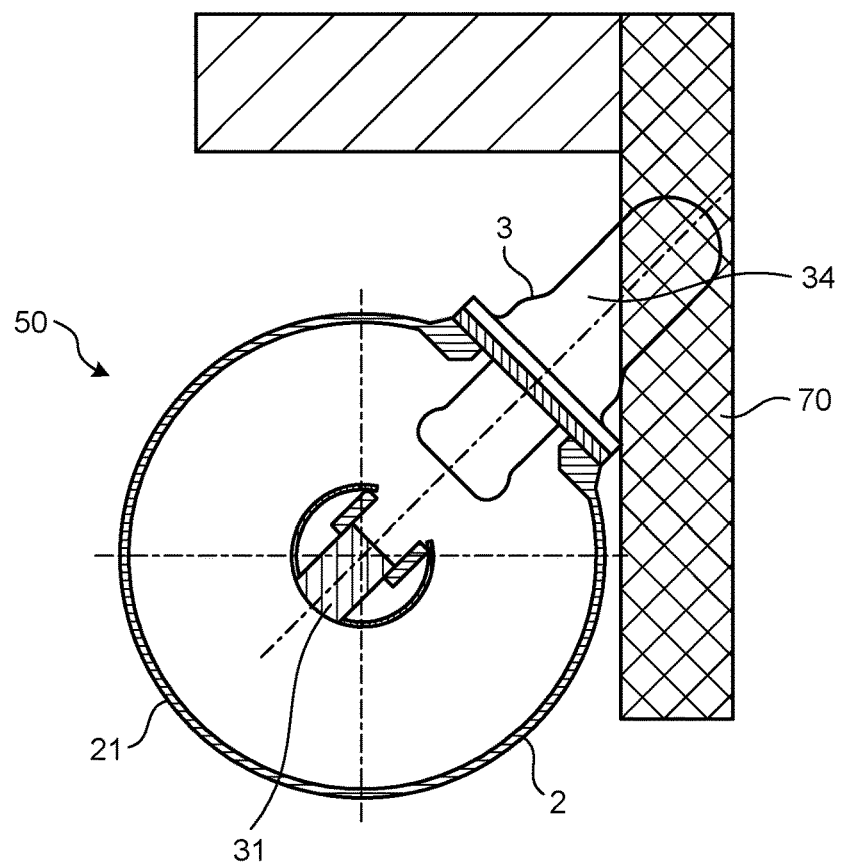
FIG. 5 is a cross-sectional view perpendicular to a main body axis illustrating a state in which an obstacle for the gas-insulated switchgear according to the first embodiment is avoided.

FIG. 4 is a plan view illustrating a state in which an obstacle for the gas-insulated switchgear according to the first embodiment is avoided. FIG. 5 is a cross-sectional view perpendicular to a main body axis illustrating a state in which an obstacle for the gas-insulated switchgear according to the first embodiment is avoided. The gas-insulated switchgear 50 illustrated in FIGS. 4 and 5 is different from the gas-insulated switchgear 50 illustrated in FIGS. 1 to 3 in that the angle Z between a direction the opening 213 is facing and the main body axis is an angle other than 90°. When the angle between the direction the opening 213 is facing and the main body axis is 90° as indicated by a broken line in FIG. 4, the grounding-switch tank 34 that serves as a branch pipe interferes with an obstacle 70. Therefore, it is necessary to shift the providing position of the grounding switch 3 toward the axial direction of the main body axis. Meanwhile, the gas-insulated switchgear 50 in which the grounding-switch tank 34 serving as a branch pipe is inclined at an angle other than 90° with respect to the main body axis can avoid the obstacle 70 in the axial direction of the main body axis, and it is not necessary to shift the providing position of the grounding switch 3. Because the gas-insulated switchgear 50 according to the first embodiment allows the branch pipe to extend at an angle other than 90° with respect to the main body axis, the branch pipe can be easily provided while avoiding the obstacle 70. That is, flexibility of the layout of the gas-insulated switchgear 50 can be improved.

Further, because the tubular surface 211 of the main body 21 is spherical, the diameter of the main body 21 is larger at its center than at both ends at which the flanges 212 are provided. Therefore, even when the branch pipe is connected directly to the tubular surface 211 of the main body 21, insulation can be surely obtained.

Second Embodiment

Figure 6:
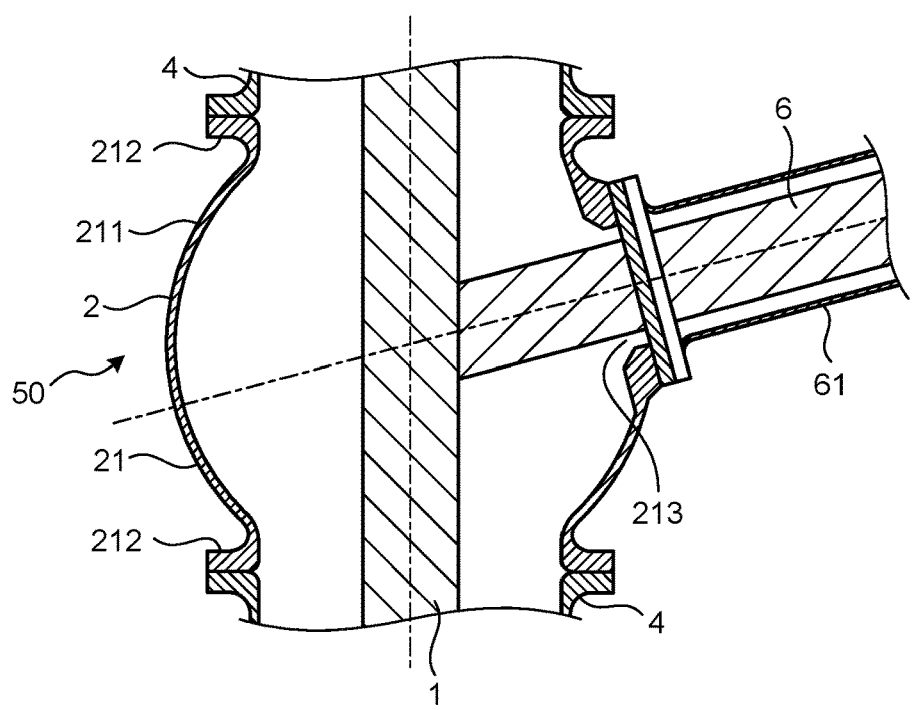
FIG. 6 is a diagram illustrating a configuration of a gas-insulated switchgear according to a second embodiment of the present invention.

FIG. 6 is a diagram illustrating a configuration of a gas-insulated switchgear according to a second embodiment of the present invention. The gas-insulated switchgear 50 according to the second embodiment includes the main circuit conductor 1 forming a bus line, the tank 2 having the tubular main body 21, at a center of which a bus line is provided, and a branch-line conductor 6 forming a branch line branching from a bus line. The branch-line conductor 6 is surrounded by a branch-pipe tank 61 forming a branch pipe. Insulating gas is enclosed in the tank 2.

The main body 21 has the spherical tubular surface 211, and has the flanges 212 at both ends thereof for connection to the adjacent tanks 4. The opening 213 is formed in the tubular surface 211 of the main body 21, to which the branch-pipe tank 61 is connected. The branch-line conductor 6 protrudes out of the tank 2 through the opening 213.

The gas-insulated switchgear 50 according to the second embodiment has a structure identical to that of the first embodiment except that the bus line and the branch line are always connected to each other. That is, flexibility of the layout of the gas-insulated switchgear 50 can be improved not only when the grounding switch 3 in which the bus line and the branch line are connected to each other only at a time of grounding is adopted, but also by forming the tubular surface 211 of the main body 21 to be spherical when a simple branching structure is adopted.

The configurations described in the above embodiments are only examples of the content of the present invention. The configurations can be combined with other well-known techniques, and part of each of the configurations can be omitted or modified without departing from the scope of the present invention.

REFERENCE SIGNS LIST 1 main circuit conductor, 2, 4 tank, 3 grounding switch, 6 branch-line conductor, 21 main body, fixed electrode, 32 movable contact, 33 link mechanism, 34 grounding-switch tank, 50 gas-insulated switchgear, 61 branch-pipe tank, 70 obstacle, 211 tubular surface, 212 flange, 213 opening, 311 hole, 312 stator contact.

The invention claimed is:

1. A gas-insulated switchgear comprising:
   a main circuit conductor forming a bus line;
   a tank having a tubular main body in which the bus line is arranged at a center of the tank; and
   a branch pipe connected to the main body, in which a branch line branching from the bus line is provided, wherein
   a tubular surface of the main body is spherical, and has an opening that allows the branch line to pass therethrough on the tubular surface,
   a direction the opening is facing is inclined with respect to an axial direction of the main body at an angle other than 90°, and
   the branch line is a movable contact of a grounding switch.

2. The gas-insulated switchgear according to claim 1, wherein
   a fixed electrode of the grounding switch is provided at a section midway of the bus line,
   the movable contact has a circular cross-section, and
   the fixed electrode is spherical, portions of the fixed electrode to be connected to the bus line are flat, and a circular hole that allows insertion of the movable contact thereinto is formed in a spherical portion of the fixed electrode.

* * * * *